United States Patent
Imholt

(10) Patent No.: US 8,465,201 B2
(45) Date of Patent: Jun. 18, 2013

(54) ELECTRO-MAGNETIC RADIATION DETECTOR

(75) Inventor: Timothy J. Imholt, Richardson, TX (US)

(73) Assignee: Raytheon Company, Waltham, MA (US)

( * ) Notice: Subject to any disclaimer, the term of this patent is extended or adjusted under 35 U.S.C. 154(b) by 314 days.

(21) Appl. No.: 12/914,493

(22) Filed: Oct. 28, 2010

(65) Prior Publication Data

US 2011/0103424 A1    May 5, 2011

Related U.S. Application Data

(60) Provisional application No. 61/256,414, filed on Oct. 30, 2009.

(51) Int. Cl.
*G01K 13/00* (2006.01)

(52) U.S. Cl.
USPC ........... 374/121; 374/141; 374/166; 374/183; 374/179; 374/112

(58) Field of Classification Search
USPC .................. 374/121, 141, 166, 183, 179, 112
See application file for complete search history.

(56) References Cited

U.S. PATENT DOCUMENTS

| | | | |
|---|---|---|---|
| 8,030,623 B2 * | 10/2011 | Jiang et al. ................. | 250/472.1 |
| 2003/0173985 A1 | 9/2003 | Cole et al. | |
| 2007/0080292 A1 * | 4/2007 | Roman et al. ................. | 250/332 |
| 2007/0205364 A1 * | 9/2007 | Ouvrier-Buffet et al. . | 250/338.1 |
| 2008/0251723 A1 * | 10/2008 | Ward et al. ................. | 250/338.4 |
| 2009/0114857 A1 * | 5/2009 | DeMeo et al. ............. | 250/516.1 |
| 2009/0121136 A1 * | 5/2009 | Gruss et al. ................. | 250/336.1 |
| 2009/0140148 A1 * | 6/2009 | Yang et al. ................. | 250/338.4 |
| 2011/0003279 A1 * | 1/2011 | Patel ................................. | 435/5 |
| 2011/0220191 A1 * | 9/2011 | Flood ............................. | 136/255 |
| 2011/0236619 A1 * | 9/2011 | Sansom et al. .................. | 428/87 |

FOREIGN PATENT DOCUMENTS

| CN | 101246052 B | 5/2010 |
|---|---|---|
| WO | WO 2008/112764 | 9/2008 |

OTHER PUBLICATIONS

Sumio Iijima, "Helical Microtubules of Graphitic Carbon," Nature, vol. 354, Nov. 7, 1991, © 1991 Nature Publishing Group, 56-58.
Sumio Iijima, "Single-Shell Carbon Nanotubes of 1-nm Diameter," Nature, vol. 363, Jun. 17, 1993, © 1993 Nature Publishing Group, 603-605.
D. S. Bethune et al., "Cobalt-Catalysed Growth of Carbon Nanotubes with Single-Atomic-Layer Walls," Nature, vol. 363, Jun. 17, 1993, © 1993 Nature Publishing Group, 605-607.
N. G. Chopra, et al., "Boron Nitride Nanotubes," *Science*, New Series, vol. 269, No. 5226 (Aug. 18, 1995) 966-967.

(Continued)

*Primary Examiner* — Mirellys Jagan
(74) *Attorney, Agent, or Firm* — Cantor Colburn LLP

(57) ABSTRACT

According to certain embodiments, an electro-magnetic radiation detector includes a sensor coupled to multiple nanostructures and an electro-magnetic radiation indicating device. The nanostructures are adapted to absorb electro-magnetic energy and generate heat according to the absorbed electro-magnetic energy. The sensor is adapted to measure the heat generated by the plurality of nanostructures and to generate a first signal according to the measured heat. The electro-magnetic radiation indicating device is operable to receive the signal from the sensor and indicate a level of electro-magnetic energy absorbed by the plurality of nanostructures according to the received signal.

10 Claims, 3 Drawing Sheets

OTHER PUBLICATIONS

J. W. Mintmire, et al., "Are Fullerene Tubules Metallic?," Physical Review Letters, Vo. 68, No. 5, Feb. 3, 1992, © 1992 *The American Physical Society*, 631-634.

N. Hamada, et al., "New One-Dimensional Conductors: Graphitic Microtubules," Physical Review Letters, vol. 68, No. 10, Mar. 9, 1992, © 1992 *The American Physical Society*, 1579-1581, Mar. 9, 1993.

A. G. Rinzler et al., "Large-Scale Purification of Single-Wall Carbon Nanotubes: Process, Product, and Characterization," *Applied Physics A*, Materials Science & Processing, © Springer-Verlag 1998, Feb. 13, 1998, 29-37.

H. Shimoda, et al., "Formation of Macroscopically Ordered Carbon Nanotube Membranes by Self-Assembly," Physica B 323 (2002), © 2002 *Elsevier Science B.V.*, 135-136.

I. W. Chiang et al., Purification and Characterization of Single-Wall Carbon Nanotubes (SWNTs) Obtained from the Gas-Phase Decomposition of CO (HiPco Process), J. Phys. Chem. B 2001, 105, © 2001 *American Chemical Society*, Published on Web Aug. 10, 2001, 8297-8301.

T. J. Imholt et al., "Nanotubes in Microwave Fields: Light Emission, Intense Heat, Outgassing, and Reconstruction," Chem. Mater, 2003, 15, © 2003 *American Chemical Society*, Published on Web Sep. 27, 2003, 3969-3970.

Patents Act 1977: Search Report under Section 17(5) mailed Feb. 4, 2011, Patents Directorate, Concept House, South Wales, regarding GB1018305.1.

* cited by examiner

ELECTRO-MAGNETIC RADIATION DETECTOR

RELATED APPLICATIONS

This application claims the benefit under 35 U.S.C. §119 (e) of the priority of U.S. Provisional Patent Application Ser. No. 61/256,414, entitled "Electro-Magnetic Radiation Detector," filed Oct. 30, 2009, the entire disclosure of which is hereby incorporated by reference.

TECHNICAL FIELD OF THE DISCLOSURE

This disclosure generally relates to detectors, and more particularly, to an electro-magnetic radiation detector.

BACKGROUND

Electro-magnetic field detectors are devices that detect the presence and/or intensity of electro-magnetic energy. Microwave field detectors are a type of electro-magnetic field detector that detect the presence of electro-magnetic energy in the microwave frequency range. Microwave energy may be generally categorized as those frequencies extending from short wave frequencies to near infrared frequencies.

SUMMARY

According to certain embodiments, an electro-magnetic radiation detector includes a sensor coupled to multiple nanostructures and an electro-magnetic radiation indicating device. The nanostructures are adapted to absorb electro-magnetic energy and generate heat according to the absorbed electro-magnetic energy. The sensor is adapted to measure the heat generated by the plurality of nanostructures and to generate a first signal according to the measured heat. The electro-magnetic radiation indicating device is operable to receive the signal from the sensor and indicate a level of electro-magnetic energy absorbed by the plurality of nanostructures according to the received signal.

Certain embodiments of the present disclosure may provide one or more technical advantages. Embodiments of the present disclosure may be smaller in size relative to conventional electro-magnetic radiation detectors. The electro-magnetic energy absorption characteristics of nanostructures may provide the electro-magnetic radiation detectors of certain embodiments of the present disclosure to be implemented in a relatively small housing that consumes relatively little power. Thus, users such as military personnel may wear the electro-magnetic radiation detector on their apparel or other areas adjacent to or on their bodies for substantially continual monitoring of harmful electro-magnetic energy while operating in an environment such as a theater of battle.

The electro-magnetic radiation detector of the present disclosure may be used for various purposes. For example, the electro-magnetic radiation detector may be used to detect levels of electro-magnetic energy that may be harmful to the human body. As a particular example, the electro-magnetic radiation detector may be used to determine various types of threats confronting military personnel. One particular type of threat may include blast overpressure caused by explosives, such as improvised explosive devices (IEDs) detonated nearby. The electro-magnetic radiation detector may determine the level of blast overpressure due to ionization of the atmosphere caused by the pressure wave of a detonated explosive. Accordingly, certain embodiments of the present disclosure provide an electro-magnetic radiation detector that may be used to detect a level of ambient electro-magnetic energy while being relatively small and lightweight for use by any user, such a military person operating in a theater of battle.

Certain embodiments of the present disclosure may provide some, all, or none of these advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of embodiments of the present disclosure and the features and advantages thereof, reference is made to the following description taken in conjunction with the accompanying drawings, in which.

DETAILED DESCRIPTION OF EXAMPLE EMBODIMENTS

Figure 1:
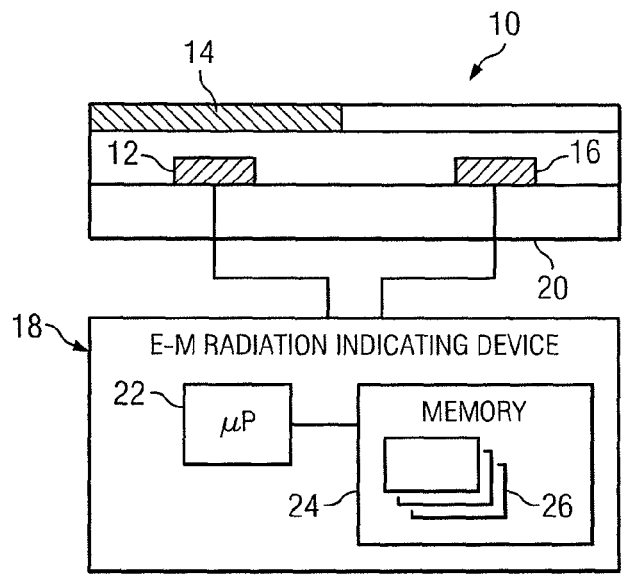
FIG. 1 illustrates an example electro-magnetic radiation detector according to certain embodiments of the present disclosure.

FIG. 1 illustrates an example electro-magnetic radiation detector 10 according to certain embodiments of the present disclosure. Electro-magnetic radiation detector 10 includes a first temperature sensor 12 coupled to multiple nanostructures 14, a second temperature sensor 16 generally void of any thermal coupling to the nanostructures 14, and an electro-magnetic radiation indicating device 18. Temperature sensors 12 and 16, and nanostructures 14 are configured on a substrate 20, which may be any device suitable for thermally coupling nanostructures 14 to temperature sensor 12 while thermally insulating temperature sensor 16 from the heating effects of nanostructures 14. Nanostructures 14 absorb at least a portion of electro-magnetic energy incident upon their surface for generating heat in the presence of electro-magnetic energy. Electro-magnetic radiation indicating device 18 continually receives signals from temperature sensor 12 for determining a level of electro-magnetic energy incident upon nanostructures 14.

Certain embodiments of the present disclosure may provide one or more technical advantages. Embodiments of the present disclosure may be smaller in size relative to conventional electro-magnetic radiation detectors. The electro-magnetic energy absorption characteristics of nanostructures 14 may provide electro-magnetic radiation detector 10 of certain embodiments of the present disclosure to be implemented in a relatively small housing that consumes relatively little power. Thus, users such as military personnel may wear electro-magnetic radiation detector 10 on their apparel or other areas adjacent to or on their bodies for substantially continual monitoring of harmful electro-magnetic energy while operating in an environment such as a theater of battle.

Electro-magnetic radiation detector 10 of the present disclosure may be used for various purposes. For example, electro-magnetic radiation detector 10 may be used to detect levels of electro-magnetic energy that may be harmful to the human body. As a particular example, electro-magnetic radiation detector 10 may be used to determine various types of threats confronting military personnel. One particular type of threat may include blast overpressure caused by explosives, such as improvised explosive devices (IEDs) detonated nearby. Electro-magnetic radiation detector 10 may determine the level of blast overpressure due to ionization of the atmosphere caused by the pressure wave of a detonated explosive. Accordingly, certain embodiments of the present disclosure provide an electro-magnetic radiation detector 10 that may be used to detect a level of ambient electro-magnetic energy while being relatively small and lightweight for use by any user, such a military person operating in a theater of battle.

Temperature sensors 12 and 16 may include any types of sensors that generate signals representing a localized temperature value with reasonable accuracy. In certain embodiments, temperature sensors 12 and 16 may include resistance temperature detectors (RTDs), such as platinum RTDs, that generate signals proportional to variations in resistance across a thermally sensitive material, which may be, for example, platinum. In certain embodiments, temperature sensor 12 or 16 may include thermocouple devices of two or more dissimilar metals that develop a voltage signal proportional to an intrinsic temperature at their junction. Temperature sensors 12 and 16, such as RTDs or thermocouple devices, may be useful due to their ability to measure temperatures within a relatively small region, such as one in thermal communication with a relatively small clump of nanostructures 14 configured on substrate 20.

In certain embodiments, temperature sensors 12 and 16 may be integrally formed on substrate 20 using a monolithic planar process in which temperature sensors 12 and 16 are formed on the surface of a semi-conductor substrate 20 in a manner similar to the process used to form other components such as transistors on the semi-conductor substrate 20. In such embodiments, substrate 20 may be formed from any semi-conductor material, which may be, for example, silicon (Si), gallium-arsenide (GaAs), Gallium-Nitride (GaN), germanium (Ge), silicon-carbide (SiC), or indium-phosphide (InP). In certain embodiments temperature sensors 12 and 16 may be formed on other types of substrates made of a material, such as plastic or other generally non-conducting material.

Temperature sensor 16 may be thermally insulated from nanostructures 14 for measuring the ambient temperature around temperature sensor 12. With this configuration, electro-magnetic radiation indicating device 18 may compensate for changes in ambient temperature by differentially combining signals from temperature sensors 12 and 16 to adjust the received signal according to the ambient temperature of temperature sensor 12. In certain embodiments, electro-magnetic radiation detector 10 may be implemented without temperature sensor 16 if compensation for ambient temperature is not desired.

Electro-magnetic radiation indicating device 18 may be of any type adapted to indicate measured values from temperature sensors 12 and/or 16. In certain embodiments, electro-magnetic radiation indicating device 18 may include a meter, such as a D'Arsonval meter or a suitable meter having a display that visually indicates the level of resistance or voltage generated by temperature sensors 12 and 16.

In the particular embodiment shown, electro-magnetic radiation indicating device 18 includes a processor 22 that executes instructions stored in a memory 24. Processor 22 may include one or more microprocessors, controllers, or any other suitable computing devices or resources and may work, either alone or with other components of electro-magnetic radiation detector 10, to provide a portion or all of the functionality of subsurface electro-magnetic radiation detector 10 described herein. Memory 24 described herein may take the form of volatile and/or non-volatile memory including, without limitation, magnetic media, optical media, random access memory (RAM), read-only memory (ROM), removable media, or any other suitable memory component. A portion or all of memory 24 may be remote from electro-magnetic radiation detector 10, if appropriate.

Embodiments of electro-magnetic radiation indicating device 18 may include logic contained within a medium. Logic may include hardware, software, and/or other logic. The medium in which the logic is encoded may include a tangible medium. The logic may perform operations when executed by processor 22. Certain logic may include a computer program, software, computer executable instructions, and/or instructions capable being executed by electro-magnetic radiation indicating device 18. The logic may also be embedded within any other suitable medium without departing from the scope of the disclosure.

The components of electro-magnetic radiation indicating device 18 may be implemented using any suitable combination of software, firmware, and hardware. These components may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Certain embodiments of electro-magnetic radiation indicating device 18 may include a single chip device in which memory 24 and processor 22 are monolithically formed on a common substrate. An electro-magnetic radiation indicating device 18 such as this may operate in a self-contained manner to perform useful functions, such as storing measured electro-magnetic energy values 26, such as peak electro-magnetic energy values, accumulated electro-magnetic energy values, average electro-magnetic energy values, and/or electro-magnetic energy threshold values in its onboard memory 24 for retrieval at a later time via wireless or direct connection to a remote computing system or for view on a display. Also, an electro-magnetic radiation indicating device 18 such as this may be relatively small in size and configured to operate in a hand-held housing with little or no external processing equipment.

Components of electro-magnetic radiation detector 10 may be communicatively coupled with other computing systems via a network. The network facilitates wireless or wireline communication, and may communicate, for example, IP packets, Frame Relay frames, Asynchronous Transfer Mode (ATM) cells, voice, video, data, and other suitable information between network addresses. The network may include one or more LANs, radio access networks (RANs), metropolitan area networks (MANs), WANs, all or a portion of the global computer network known as the Internet, and/or any other communication system or systems at one or more locations.

Electro-magnetic radiation indicating device 18 may include any visual and/or audible mechanism for indicating the level of electro-magnetic energy. For example, electro-magnetic radiation indicating device 18 may include an audible alarm that sounds if the ambient electro-magnetic energy exceeds a specified threshold value 26 stored in memory 24. As another example, electro-magnetic radiation indicating device 18 may include a display that visually indicates the level of electro-magnetic energy incident upon nanostructures 14. In one embodiment, electro-magnetic radiation indicating device 18 may include a lookup table storing values representing differences in temperature between temperature sensors 12 and 16. Electro-magnetic radiation indicating device 18 may access this lookup table to determine the type of electro-magnetic energy according to values stored in the lookup table.

In operation of an example embodiment, electro-magnetic radiation indicating device 18 receives signals from temperature sensor 12. Those signals may represent heat generated by nanostructures 14 that is caused by absorption of electro-magnetic energy. The received signals may be indicative of the temperature of the nanostructures 14. Electro-magnetic radiation indicating device 18 may then provide an indication of the measured temperature using a display, such as a D'Arsonval meter, a liquid crystal display (LCD), or a computer display. Electro-magnetic radiation indicating device 18 may store the measured temperature for viewing at a later time. In certain embodiments, electro-magnetic radiation indicating device 18 may receive signals from temperature sensor 16 representing ambient temperatures around temperature sensor 12 and differentially combine both signals to compensate for changes in ambient temperature.

Nanostructures 14 may be any type that absorbs electro-magnetic energy. In certain embodiments, nanostructures 14 may include carbon nanotubes (CNTs), such as single-walled nanotubes (SWNTs) that are either semiconducting or conducting. SWNTs generally have the shape of a rolled up graphite sheet that forms a relatively thin cylinder with no seam. In many cases, the length and the diameter of these SWNTs may be dependent on the type of metallic catalyst and environmental conditions employed during fabrication. SWNTs may have a diameter that is typically in the range of 0.6 to 5.0 nanometers. The lengths of the SWNTs can be anywhere from a few hundred nanometers to several centimeters in length. Theoretically, the lengths of SWNTs can be relatively long. The synthesis of SWNTs is accomplished by many different techniques including several in which the SWNTs may be grown directly on substrate 20 or other suitable underlying structure that may allow its placement on substrate 20.

In certain embodiments, nanostructures 14 may have specified dimensions for detecting certain frequencies of electro-magnetic energy. That is, the absorption rate of electro-magnetic energy by nanostructure 14 may be a function of its physical characteristics, such as its length, width, purity, and/or level of conductivity. For example, one electro-magnetic radiation detector 10 may be fabricated with nanostructures 14 that are sensitive to electro-magnetic energy in the range of 1 to 5 Giga-Hertz, while another electro-magnetic radiation detector 10 may be fabricated that is sensitive to electro-magnetic energy in the range of 5 to 10 Giga-Hertz. Thus, the approximate frequency range as well as the intensity of electro-magnetic energy may be monitored by multiple electro-magnetic radiation detectors 10.

Figure 2:
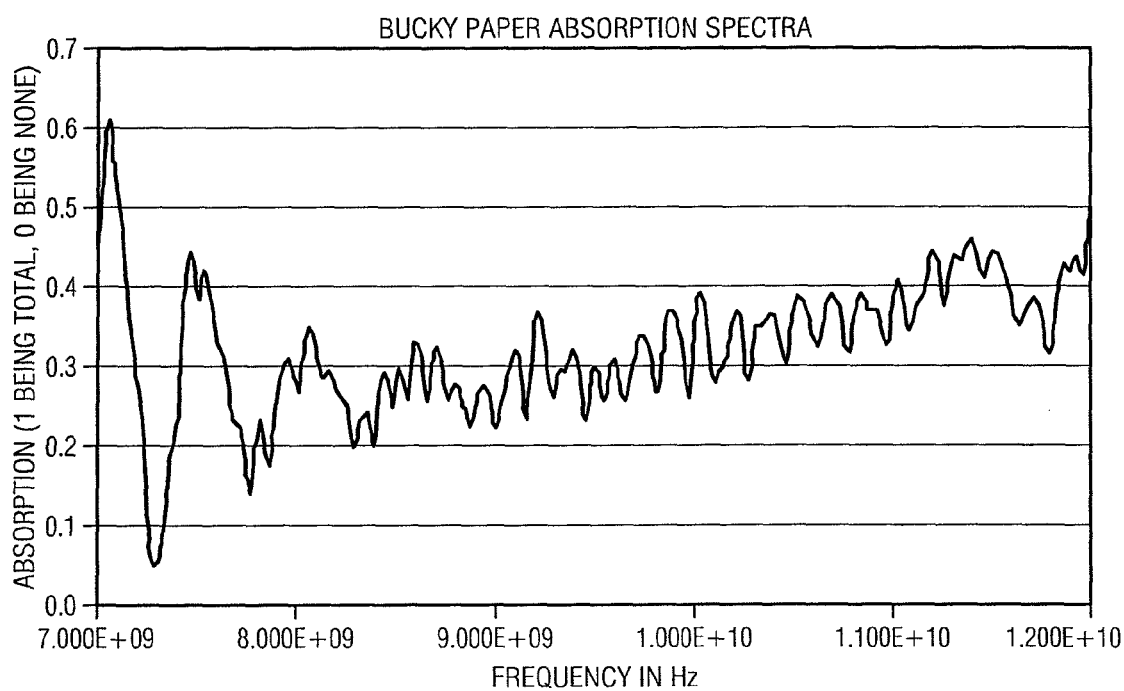
FIG. 2 illustrates an example absorption spectra that may be exhibited by a sample of single-walled nanotubes (SWNTs) when subjected to electro-magnetic energy at frequencies in the range of 7 to 12 Giga-Hertz.

FIG. 2 illustrates an example absorption spectra that may be exhibited by a sample of SWNTs when subjected to electro-magnetic energy at frequencies in the range of 7 to 12 Giga-Hertz. The particular example absorption spectra shown was measured using SWNTs configured in a sheet of buckypaper. Buckypaper is generally formed of a relatively thin membrane of SWNTs. The membrane of SWNTs used in the buckypaper is approximately 500 micrometers in thickness. The absorption spectra merely shows an example absorption spectra that may exhibited by a certain type of nanostructure, which in this particular case, include SWNTs. Certain embodiments of other types of nanostructures 14 such as multi-walled nanotubes (MWNTs) or nanostructures made of materials other than carbon may exhibit absorption spectra different from the absorption spectra shown.

The absorption spectra shown was taken with a sweep source that was performed 25 times across the stated range. The results shown are the average of these 25 sweeps to reduce experimental error. The signals recorded include the transmitted and reflected power levels. These two power levels were then added together then subtracted from the incident voltage. The original incident voltage was then divided into this voltage in order to obtain the portion of the electro-magnetic field absorbed by the buckypaper.

The absorption spectra shown reveals several interesting characteristics. For example, long chain molecules normally absorb electro-magnetic energy over a wide range of frequencies. A group of nanostructures 14, such as those in buckypaper, comprise a generally large group of relatively long chain molecules. These molecules may have different lengths and diameters forming various aspect ratios that affects the manner in which electro-magnetic energy is absorbed. As shown, the thin film of SWNTs in the buckypaper absorb a relatively large amount of incident microwave energy. It may be shown by this absorption spectra that SWNTs may be relatively efficient absorption of electro-magnetic energy at microwave frequencies. At higher power levels, the absorption of electro-magnetic energy may therefore result in a rapid and dramatic rise in temperature in certain embodiments.

Although the graph displays the absorption spectra of SWNTs due to electro-magnetic energy at frequencies between 7 and 12 Giga-Hertz, any frequency of electro-magnetic energy may be used that causes the nanostructures to be heated. In certain embodiments, the electro-magnetic field may be any range of frequencies in the microwave range. The microwave range is generally regarded to be frequencies extending from short wave frequencies to near infrared frequencies. In certain embodiments, nanostructures 14 implemented with electro-magnetic radiation detector 10 may be sensitive to frequencies at or below short wave frequencies, or at or above the near infrared frequency range.

Figure 3:
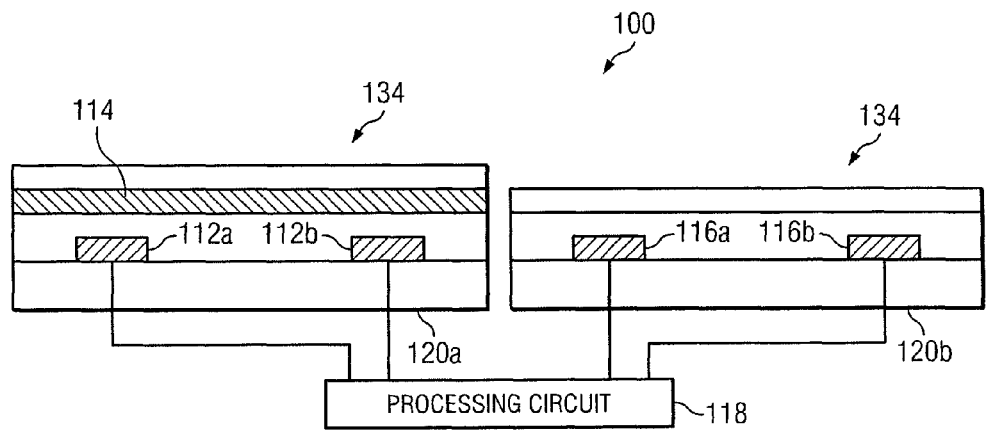
FIG. 3 illustrates another example electro-magnetic radiation detector according to certain embodiments of the present disclosure.

FIG. 3 illustrates another example electro-magnetic radiation detector 100 according to certain embodiments of the present disclosure. Electro-magnetic radiation detector 100 includes temperature sensors 112a, 112b, 116a, and 116b, multiple nanostructures 114, two substrates 120a and 120b, and an electro-magnetic radiation indicating device 118 that are each similar in design and construction to temperature sensor 12 and 16, nanostructures 14, substrate 20, and electro-magnetic radiation indicating device 18 of FIG. 1. Electro-magnetic radiation detector 100 differs, however in that it has two temperature sensors 112a and 112b coupled to nanostructures 14, and two temperature sensors 116a and 116b thermally insulated from nanostructures 14. Furthermore, temperature sensors 116a and 116b are configured on a substrate 120b that is separate from substrate 120a on which nanostructures 14 are configured.

In certain embodiments, substrates 120a and/or 120b may be covered with a layer 134 of a suitable compound to prevent oxidation of nanostructures 14 and/or temperature sensors 12 and 16. Examples of suitable materials from which layer 134 may be formed include, but are not limited to silicon-dioxide, Plexiglas, or any material that is generally impermeable to moisture and has relatively good thermal insulating characteristics.

Certain embodiments incorporating separate substrates 120a and 120b may provide an advantage in that relatively good thermal insulation of temperature sensors 116a and 116b from nanostructures 114 may be achieved. Additionally, fabrication of nanostructures 114 directly on substrate 120a may be accomplished without masking techniques that may otherwise be required if temperature sensors 116a and 116b were fabricated on the same substrate 120a on which nanostructures 14 are fabricated.

Certain embodiments incorporating two temperature sensors 112a and 112b may provide enhanced reliability and/or precision of measurements. Likewise, certain embodiments incorporating two temperature sensors 116a and 116b may provide enhanced reliability and/or precision of control measurements used to monitor ambient temperatures around temperature sensors 112a and 112b. For example, the failure of one temperature sensor 112a or temperatures sensor 112b will not cause electro-magnetic radiation detector 10 to cease functioning. Additionally, electro-magnetic radiation indicating device 18 may average readings from temperature sensor pairs 112a and 112b, and 116a and 116b to increase the accuracy of electro-magnetic radiation detector 100.

Figure 4:
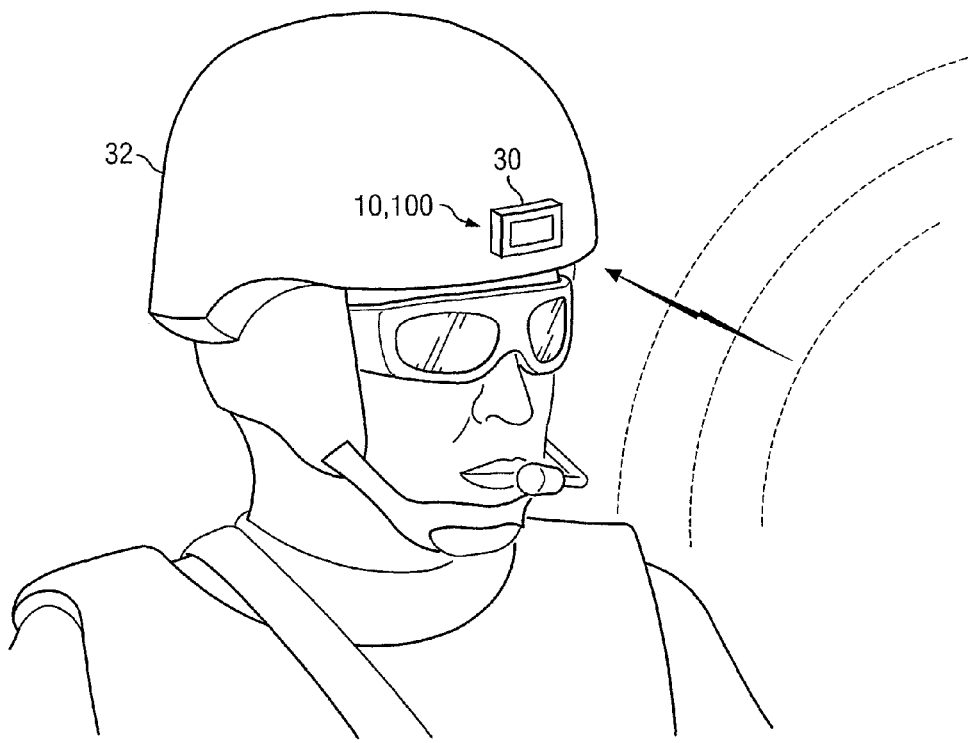
FIG. 4 illustrates an example implementation of the electro-magnetic radiation detector of FIG. 1 or 3, respectively, that may be configured on a piece of apparel worn by a user.

FIG. 4 illustrates an example implementation of the electro-magnetic radiation detector 10 or 100 of FIG. 1 or 3, respectively, that may be configured on a piece of apparel worn by a user. The example electro-magnetic radiation detector 10 or 100 shown is configured in a relatively small housing 30 that may be permanently or temporarily affixed to a helmet 32 worn by a user, which in this particular example, is a military soldier. Although the example embodiment describes an electro-magnetic radiation detector 10 or 100 that is affixed to a helmet 32, certain embodiments may be permanently or temporarily affixed to any piece of apparel or portion of the user's body. For example, electro-magnetic radiation detector 10 may be configured as a wristwatch that may be worn on a wrist of the user.

An example electro-magnetic radiation detector 10 may include a substrate 20 or 120a and 120b that may have approximately 1.0 milli-meter by 1.0 milli-meter of surface area. Correspondingly, an example electro-magnetic radiation detector 100 may include a substrate 120a and 120b that may each have approximately 1.0 milli-meter by 1.0 milli-meter of surface area. The example electro-magnetic radiation detector 10 or 100 may be powered by a relatively small electrical power source, such as a battery commonly used in wristwatches. The example electro-magnetic radiation detector 10 or 100 may also include a memory 24 that stores electro-magnetic energy exposure levels generated by temperature sensors 12 or temperature sensors 112a and 112b during use. The stored electro-magnetic energy exposure levels may then be downloaded to an external computing system for analysis at a later time.

Figure 5:
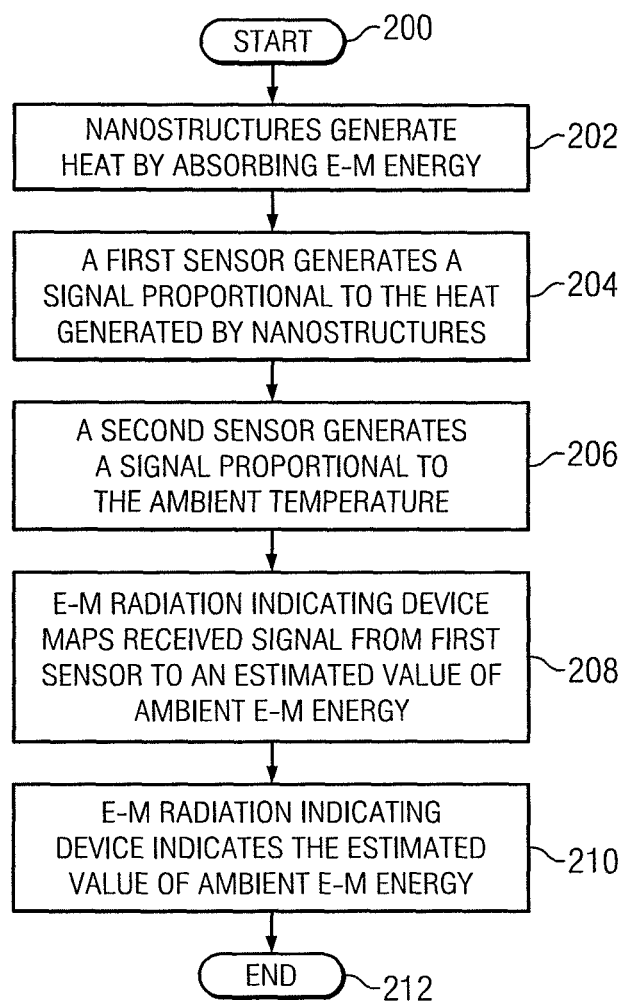
FIG. 5 illustrates an example method for receiving and processing electro-magnetic energy from the electro-magnetic radiation detector of FIG. 1 or 3, respectively.

FIG. 5 illustrates an example method for receiving and processing electro-magnetic energy from the electro-magnetic radiation detector 10 or 100 of FIG. 1 or 3, respectively. In act 200, the process is initiated.

In act 202, nanostructures 14 or 114 absorb electro-magnetic energy and generate heat according to the absorbed electro-magnetic energy. Nanostructures 14 or 114 may include any type that are at least partially conducting for absorbing electro-magnetic energy and have suitable physical characteristics for absorbing electro-magnetic energy at a desired frequency range. For example, nanostructures 14 or 114 may be selected to have a particular conductivity, length, and/or width that is at least partially resonates at a frequency of interest. In certain embodiments, nanostructures 14 or 114 may be selected to have varying conductivities, lengths and/or widths to have resonances over a range of frequencies, such as those frequencies in the microwave frequency range.

In act 204, a first temperature sensor 12 or temperature sensors 112a and 112b measures the heat generated by nanostructures 14 or 114 and generates a first signal proportional to the measured heat. In certain embodiments, two or more temperature sensors 112a and 112b may be implemented to enhance the precision and/or reliability of electro-magnetic energy measurements obtained.

In act 206, optionally, a temperature sensor 16 or temperature sensor 116a and 116b measures the ambient temperature around temperature sensor 12 or temperature sensors 112a and 112b and generates a second signal proportional to the ambient temperature. In certain embodiments, temperature sensor 16 or temperature sensor 116a and 116b may be thermally insulated from nanostructures 14 or 114 to reduce heating affects that would otherwise compromise the accuracy of the ambient temperature measurement. In certain embodiments, temperature sensors 116a and 116b may be configured on substrate 120b that is separate from substrate 120a on which temperature sensor 120a is configured.

In act 208, electro-magnetic radiation indicating device 18 or 118 receives the first signal from temperature sensor 12 or temperature sensors 112a and 112b and maps the received first signal(s) to an electro-magnetic energy exposure value. A number of factors may affect the level of heating caused in the presence of electro-magnetic energy. Examples of such factors may include, the level of thermal coupling provided between nanostructures 14 or 114 and temperatures sensor 12 or temperature sensors 112a and 112b, the heat retention capacity of certain elements such as substrate 20 or substrate 120a and 120b, the transfer function of temperature sensor 12 or temperature sensors 112b and 112b, and/or the absorption rate of nanostructures 14 or 114 used. Electro-magnetic radiation indicating device 18 or 118 maps the received signal to the electro-magnetic energy value to adjust for various factors that may affect the precision of electro-magnetic radiation detector 10 or 100.

In certain embodiments, electro-magnetic radiation indicating device 18 or 118 may receive a second signal from temperature sensor 16 or temperature sensor 116a and 116b and differentially combine the second signal with the first signal from temperature sensor 12 or temperature sensor 112a and 112b to compensate for changes in ambient temperature. In this manner, electro-magnetic radiation detector 10 or 100 may provide a relatively accurate indication of electro-magnetic energy exposure when operating in cold or hot environments.

In act 210, electro-magnetic radiation indicating device 18 or 118 indicates the level of electro-magnetic energy absorbed by nanostructures 14 or 114. In certain embodiments, electro-magnetic radiation indicating device 18 or 118 may include a display meter, such as a D'Arsonval meter or other similar type of display device that displays the resistance or voltage signal provided by temperature sensor 12 or temperatures sensors 112a and 112b. In certain embodiments, electro-magnetic radiation indicating device 18 or 118 may include a memory 24 that stores measured electro-magnetic energy values for view and/or analysis at a later time.

Examples of stored electro-magnetic energy values may include, peak electro-magnetic energy values, accumulated electro-magnetic energy values, and/or average electro-magnetic energy values. In certain embodiments, electro-magnetic radiation indicating device 18 or 118 may include an alarming device, such as a buzzer that generates an audible tone when electro-magnetic energy values have exceeded a certain threshold value.

The previously described process continues throughout operation of electro-magnetic radiation detector 10 or 100 to monitor the presence of ambient electro-magnetic energy. When use of electro-magnetic radiation detector 10 or 100 is no longer needed or desired, the process ends in act 212.

Modifications, additions, or omissions may be made to electro-magnetic radiation detector 10 or 100 without departing from the scope of the disclosure. The components of electro-magnetic radiation detector 10 or 100 may be integrated or separated. For example, temperature sensors 12 and/or 16 may be integrally formed on substrate 20, which may be, for example, a silicon substrate, or temperature sensors 12 and/or 16 may be mounted to substrate 20 following their fabrication. Moreover, the operations of electro-magnetic radiation detector 10 or 100 may be performed by more, fewer, or other components. For example, substrate 20 may be packaged in an insulative housing to minimize the effects of the ambient environment. Additionally, operations of electro-magnetic radiation indicating device 18 may be performed using any suitable logic comprising software, hardware, and/or other logic. As used in this document, "each" refers to each member of a set or each member of a subset of a set.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. An electro-magnetic radiation detector comprising:
   a first substrate;
   a plurality of nanostructures grown on the first substrate, the plurality of nanostructures adapted to absorb electro-magnetic energy and generate heat according to the absorbed electro-magnetic energy;
   a first sensor integrally formed on the first substrate and adapted to measure the heat generated by the plurality of nanostructures and to generate a first signal according to the measured heat, the first signal indicative of a temperature of the plurality of nano structures; and
   a second sensor adapted to generate a second signal indicative of an ambient temperature around the first sensor, the second sensor formed on either the first substrate or on a second substrate; and
   an electro-magnetic radiation indicating device coupled to the first sensor and the second sensor, respectively, the electro-magnetic radiation indicating device operable to:
   receive the first signal from the first sensor;
   indicate a level of electro-magnetic energy absorbed by the plurality of nanostructures according to the received first signal; and
   differentially combine the first signal and the second signal to compensate for a variation in the first signal due to a corresponding variation in ambient temperature.

2. The electro-magnetic radiation detector of claim 1, wherein the plurality of nanostructures is grown on the substrate.

3. An electro-magnetic radiation detector comprising:
   a plurality of nanostructures integrally formed on a substrate, and adapted to absorb electro-magnetic energy and generate heat according to the absorbed electro-magnetic energy;
   a first sensor formed on the substrate and coupled to the plurality of nanostructures and adapted to measure the heat generated by the plurality of nanostructures and to generate a first signal according to the measured heat, the first signal indicative of a temperature of the plurality of nanostructures;
   a second sensor formed on the substrate and adapted to generate a second signal indicative of an ambient temperature around the first sensor;
   an electro-magnetic radiation indicating device coupled to the first sensor and the second sensor, and operable to:
   receive the first signal from the first sensor;
   receive the second signal from the second sensor;
   differentially combine the first signal and the second signal to compensate for a variation in the first signal due to a corresponding variation in ambient temperature; and
   indicate a level of electro-magnetic energy absorbed by the plurality of nanostructures according to the received first signal.

4. The electro-magnetic radiation detector of claim 3, wherein the first sensor comprises one or more of the following:
   a resistance temperature detector; and
   a thermocouple.

5. The electro-magnetic radiation detector of claim 3, wherein the electro-magnetic energy comprises electro-magnetic energy in the microwave frequency range.

6. The electro-magnetic radiation detector of claim 3, wherein the plurality of nanostructures, the first sensor, and the electro-magnetic radiation indicating device are configured in a housing that is adapted to be worn by a user.

7. The electro-magnetic radiation detector of claim 3, wherein the plurality of nanostructures comprise a plurality of carbon nanotubes.

8. The electro-magnetic radiation detector of claim 7, wherein the plurality of carbon nanotubes comprise one or more of the following:
   a plurality of single-walled carbon nanotubes; and
   a plurality of multi-walled carbon nanotubes.

9. An electro-magnetic radiation detector comprising:
   a plurality of nanostructures integrally formed on a substrate, and adapted to absorb electro-magnetic energy and generate heat according to the absorbed electro-magnetic energy;
   a first sensor formed on the substrate and coupled to the plurality of nanostructures and adapted to measure the heat generated by the plurality of nanostructures and to generate a first signal according to the measured heat, the first signal indicative of a temperature of the plurality of nanostructures;
   a second sensor formed on the substrate, the second sensor coupled to the plurality of nanostructures and adapted to measure the heat generated by the plurality of nanostructures and to generate a second signal according to the measured heat, the second signal indicative of the temperature of the plurality of nano structures; and
   an electro-magnetic radiation indicating device coupled to the first sensor the second sensor, and operable to:
   receive the first signal from the first sensor;
   receive the second signal from the second sensor; and
   generate an average temperature signal that is an average value between the first signal and the second signal; and indicate a level of electro-magnetic energy absorbed by the plurality of nanostructures according to the received first signal.

10. An electro-magnetic radiation detector comprising:

a first substrate;

a plurality of nanostructures grown on the first substrate, the plurality of nanostructures adapted to absorb electro-magnetic energy and generate heat according to the absorbed electro-magnetic energy;

a first pair of sensors integrally formed on the first substrate and adapted to measure the heat generated by the plurality of nanostructures and to generate a first pair of signals according to the measured heat, the first pair of signals indicative of a temperature of the plurality of nanostructures; and a second pair of sensors integrally formed on a second substrate and adapted to generate a second pair of signals indicative of an ambient temperature around the first pair of sensors; and an electro-magnetic radiation indicating device coupled to the first pair of sensors and the second pair of sensors, respectively, the electro-magnetic radiation indicating device operable to:

receive the first pair of signals from the first pair of sensors;

indicate a level of electro-magnetic energy absorbed by the plurality of nanostructures according to the received first pair of signals; and differentially combine the first pair of signals and the second pair of signals to compensate for a variation in the first pair of signals due to a corresponding variation in ambient temperature.

\* \* \* \* \*